(12) United States Patent
Kvochko et al.

(10) Patent No.: US 11,381,972 B2
(45) Date of Patent: Jul. 5, 2022

(54) OPTIMIZING AUTHENTICATION AND MANAGEMENT OF WIRELESS DEVICES IN ZERO TRUST COMPUTING ENVIRONMENTS

(71) Applicant: Bank of America Corporation, Charlotte, NC (US)

(72) Inventors: Elena Kvochko, New York, NY (US); Michael Ogrinz, Easton, CT (US); John C. Checco, Stony Point, NY (US)

(73) Assignee: Bank of America Corporation, Charlotte, NC (US)

( * ) Notice: Subject to any disclaimer, the term of this patent is extended or adjusted under 35 U.S.C. 154(b) by 359 days.

(21) Appl. No.: 16/799,275

(22) Filed: Feb. 24, 2020

(65) Prior Publication Data
US 2021/0266743 A1    Aug. 26, 2021

(51) Int. Cl.
*H04W 12/08* (2021.01)
*G06N 20/00* (2019.01)
(Continued)

(52) U.S. Cl.
CPC .......... *H04W 12/08* (2013.01); *G06F 21/552* (2013.01); *G06N 20/00* (2019.01); *H04W 12/37* (2021.01);
(Continued)

(58) Field of Classification Search
CPC ... H04W 12/08; H04W 12/37; H04W 12/065; H04W 12/68; G06F 21/552;
(Continued)

(56) References Cited

U.S. PATENT DOCUMENTS 9,094,445 B2    7/2015   Moore et al.
9,788,211 B2    10/2017  Zhang
(Continued)

OTHER PUBLICATIONS

Medin, et al, "The 5G Ecosystem: Rists & Opportunities for DoD," Defense Innovation Board (DIB 5G Study), Apr. 3, 3019, retrieved from <https://media.defense.gov/2019/Apr/03/2002109302/-1/-1/0/DIB_5G_STUDY_04.03.19.PDF>, 33 pages.
(Continued)

*Primary Examiner* — Christopher A Revak
(74) *Attorney, Agent, or Firm* — Banner & Witcoff, Ltd.

(57) ABSTRACT

Aspects of the disclosure relate to optimizing authentication and management of wireless devices in zero trust computing environments. In some embodiments, a computing platform may receive, from a user computing device, a connection request. Subsequently, the computing platform may generate, using an artificial-intelligence engine, a profile for the connection request. Based on the profile for the connection request generated using the artificial-intelligence engine, the computing platform may determine that the connection request is valid. In response to determining that the connection request is valid, the computing platform may establish a connection with the user computing device. Based on establishing the connection with the user computing device, the computing platform may assign an identity to the user computing device. After assigning the identity to the user computing device, the computing platform may monitor behavior of the user computing device based on the identity assigned to the user computing device.

20 Claims, 10 Drawing Sheets

(51) Int. Cl.
    *G06F 21/55*     (2013.01)
    *H04W 12/37*     (2021.01)
    *H04W 12/065*     (2021.01)
    *H04L 67/303*     (2022.01)
    *H04L 67/30*     (2022.01)
    *H04L 67/306*     (2022.01)

(52) U.S. Cl.
    CPC ........ *G06F 2221/034* (2013.01); *H04L 67/30* (2013.01); *H04L 67/303* (2013.01); *H04L 67/306* (2013.01); *H04W 12/065* (2021.01)

(58) Field of Classification Search
    CPC ... G06F 2221/034; G06N 20/00; H04L 67/30; H04L 67/303; H04L 67/306; H04L 63/102
    See application file for complete search history.

(56) References Cited

U.S. PATENT DOCUMENTS

| | | | |
|---|---|---|---|
| 9,961,624 | B1 | 5/2018 | Zait |
| 10,110,585 | B2 | 10/2018 | Ghafourifar et al. |
| 10,257,668 | B2 | 4/2019 | Shaw et al. |
| 10,673,870 | B2* | 6/2020 | Pierce ............... H04L 41/142 |
| 2014/0143404 | A1* | 5/2014 | Kennedy ............ H04L 67/18 709/224 |
| 2018/0316676 | A1 | 11/2018 | Gilpin et al. |
| 2019/0068570 | A1 | 2/2019 | Ghafourifar et al. |
| 2019/0141015 | A1 | 5/2019 | Nellen |
| 2019/0368103 | A1* | 12/2019 | Choung ................ D06F 33/48 |
| 2020/0053604 | A1 | 2/2020 | Shalev et al. |
| 2020/0054553 | A1 | 2/2020 | Saltzman et al. |
| 2020/0054872 | A1 | 2/2020 | Simon et al. |
| 2020/0055595 | A1 | 2/2020 | Bailie |
| 2020/0057664 | A1 | 2/2020 | Durham et al. |
| 2020/0057822 | A1 | 2/2020 | Sow et al. |
| 2020/0057851 | A1 | 2/2020 | Agarwal |
| 2020/0057855 | A1 | 2/2020 | Shear et al. |
| 2020/0057872 | A1 | 2/2020 | Ingraham et al. |
| 2020/0057992 | A1 | 2/2020 | Neumayer et al. |
| 2020/0057994 | A1 | 2/2020 | Hunn |
| 2020/0058020 | A1 | 2/2020 | Natarajan |
| 2020/0058190 | A1 | 2/2020 | Cunningham, II et al. |
| 2020/0059098 | A1 | 2/2020 | Dong et al. |
| 2020/0059344 | A1 | 2/2020 | Oizumi et al. |
| 2020/0059358 | A1 | 2/2020 | Legre et al. |
| 2020/0059361 | A1 | 2/2020 | Konda et al. |
| 2020/0059362 | A1 | 2/2020 | Brody et al. |
| 2020/0059364 | A1 | 2/2020 | Konda et al. |
| 2020/0059373 | A1 | 2/2020 | Norum |
| 2020/0059474 | A1 | 2/2020 | Rojas et al. |
| 2020/0059478 | A1 | 2/2020 | Meriac |
| 2020/0059481 | A1 | 2/2020 | Sekar et al. |
| 2020/0059483 | A1 | 2/2020 | Weingarten et al. |
| 2020/0059536 | A1 | 2/2020 | Shribman et al. |
| 2020/0401848 | A1* | 12/2020 | Liu ..................... G06K 9/6256 |
| 2021/0103461 | A1* | 4/2021 | Esibov ................... H04L 67/22 |
| 2021/0173910 | A1* | 6/2021 | Kursun ............... G06K 9/6289 |
| 2021/0306372 | A1* | 9/2021 | Koral ................... H04L 67/306 |
| 2022/0094699 | A1* | 3/2022 | Birur ................... G06F 16/9024 |

OTHER PUBLICATIONS

Maloney, "How 5G is Likely to Put Wether Forecasting at Risk," Hackaday, Apr. 24, 2020; retrieved from https://hackaday.com/2019/04/16/5g-buildout-likely-to-put-weather-forecasting-at-risk/, 34 pages.

Corrigan, "Pentagon to Begin Testing 5G at Four Domestic Installations," Nextgov, Oct. 23, 2019, retrieved from https://www.nextgov.com/emerging-tech/2019/10/pentagon-begin-testing-5g-four-domestic-installations/160830/, 10 pages.

Pegoraro, "What will 5G mean for your? A reality check on the hype," FastCompany, Oct. 23, 2019, retrieved from <https://www.fastcompany.com/90420789/what-will-5g-mean-for-you-a-reality-check-on-the-hype>, 10 pages.

Rose, et al, "Zero Trust Architecture," Draft NIST Special Publication 800-207, National Institute of Standards and Technology, U.S. Department of Commerce, Sep. 2019, available at https://doi.org/10.6028/NIST.SP.800-207-draft, 49 pages.

"What is Zero Trust?," Paloalto Networks, retrieved Jan. 13, 2020 from https://www.paloaltonetworks.com/cyberpedia/what-is-a-zero-trust-architecture, 8 pages.

* cited by examiner

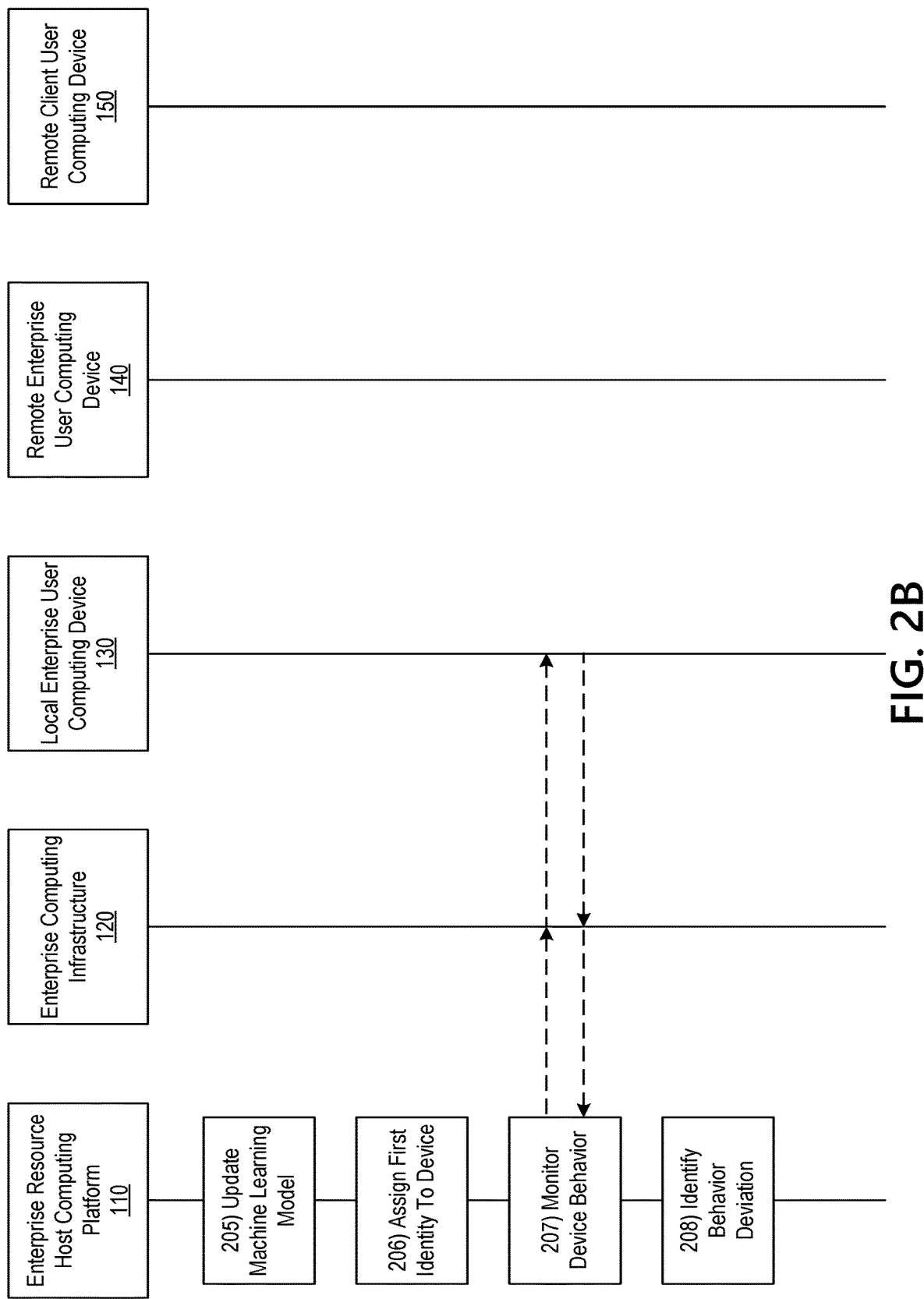

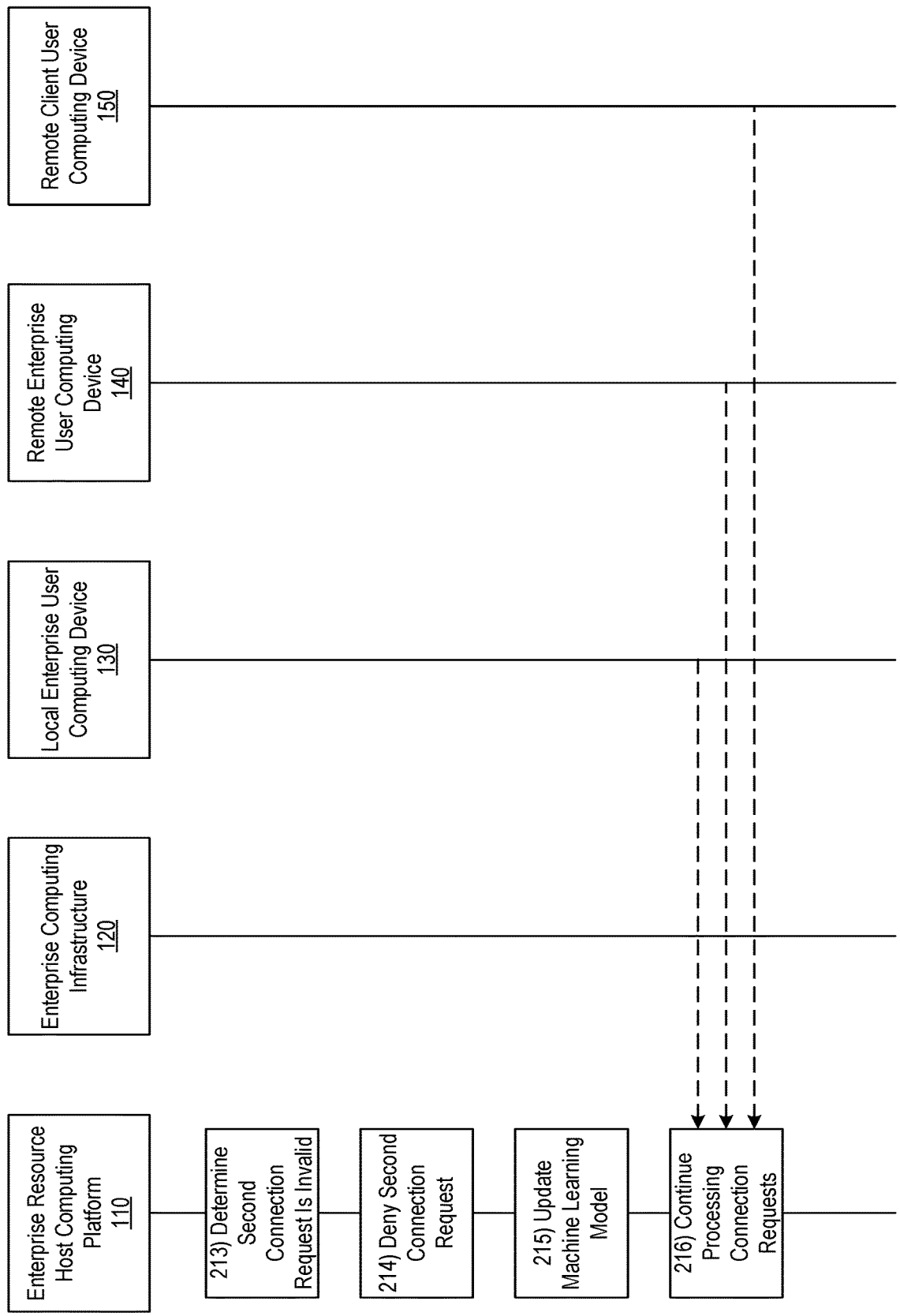

OPTIMIZING AUTHENTICATION AND MANAGEMENT OF WIRELESS DEVICES IN ZERO TRUST COMPUTING ENVIRONMENTS

BACKGROUND

Aspects of the disclosure relate to digital data processing systems, ensuring information security, and preventing unauthorized access to secure information systems and enterprise resources. In particular, one or more aspects of the disclosure relate to optimizing authentication and management of wireless devices in zero trust computing environments.

Enterprise organizations may utilize various computing infrastructure to maintain confidential information and/or other sensitive data that is created and/or used for various purposes. Ensuring that this data is secure and only accessible to appropriate users for appropriate purposes may be critically important to protecting the integrity and confidentiality of the underlying information and associated resources. In many instances, it may be difficult to ensure the security and integrity of enterprise-managed information and enterprise resources, particularly when also attempting to optimize the resource utilization, bandwidth utilization, and efficient operations of the enterprise computing infrastructure.

SUMMARY

Aspects of the disclosure provide effective, efficient, scalable, and convenient technical solutions that address and overcome the technical problems associated with ensuring information security and preventing unauthorized access to enterprise-managed information and enterprise resources by optimizing authentication and management of wireless devices in zero trust computing environments.

For example, in enterprise computing environments that implement zero trust architecture (ZTA), alternative approaches to information security may be used in place of conventional approaches. For instance, rather than only protecting the perimeter of an enterprise network and then assuming that connections within the perimeter are secure, it may be assumed that at any given point time—and at any point in the enterprise network—every connection cannot be trusted. Rather, a continuous, identity-based authentication model may be used to verify each and every connection that is made within the enterprise network, across various devices and/or nodes. The challenges associated with implementing such an authentication model may be amplified as newer wireless networks also become more prevalent. For instance, as fifth-generation (5G) wireless networks proliferate, a relatively larger number of devices will be able to submit a relatively larger number of connection requests to an enterprise network, as a result of the increased bandwidth provided by 5G networks, as well as the generally faster connection speeds, scale, and fidelity provided by such networks. These technologies provide both challenges and opportunities to enterprise technology administrators, as illustrated in greater detail below.

In accordance with one or more embodiments, a computing platform having at least one processor, a communication interface, and memory may receive, via the communication interface, from a first user computing device, a first connection request. Subsequently, the computing platform may generate, using an artificial-intelligence engine, a first profile for the first connection request. Based on the first profile for the first connection request generated using the artificial-intelligence engine, the computing platform may determine that the first connection request is valid. In response to determining that the first connection request is valid, the computing platform may establish a first connection with the first user computing device. Based on establishing the first connection with the first user computing device, the computing platform may assign a first identity to the first user computing device. After assigning the first identity to the first user computing device, the computing platform may monitor behavior of the first user computing device based on the first identity assigned to the first user computing device.

In some embodiments, receiving the first connection request from the first user computing device may include receiving the first connection request from the first user computing device via a fifth-generation (5G) wireless network.

In some embodiments, in generating the first profile for the first connection request using the artificial-intelligence engine, the computing platform may capture one or more connection parameters of the first connection request. Subsequently, the computing platform may score the one or more connection parameters of the first connection request based on a parameter model that is generated by the artificial-intelligence engine based on a training dataset comprising connection parameter data associated with past connection requests. In addition, scoring the one or more connection parameters of the first connection request based on the parameter model generated by the artificial-intelligence engine may produce a first connection request score value.

In some embodiments, scoring the one or more connection parameters of the first connection request based on the parameter model generated by the artificial-intelligence engine may include scoring a network address of the first connection request, a device identifier of the first user computing device, a screen size parameter of the first user computing device, or one or more operating parameters of the first user computing device.

In some embodiments, determining that the first connection request is valid may include determining that the first connection request is valid based on the first connection request score value exceeding a threshold value computed by the artificial-intelligence engine.

In some embodiments, establishing the first connection with the first user computing device may include allowing the first user computing device to access an implicit trust zone associated with at least one enterprise resource.

In some embodiments, assigning the first identity to the first user computing device may include calculating an initial trust score based on device properties of the first user computing device and connection properties of the first connection.

In some embodiments, monitoring the behavior of the first user computing device based on the first identity assigned to the first user computing device may include monitoring the behavior of the first user computing device based on the initial trust score.

In some embodiments, after establishing the first connection with the first user computing device, the computing platform may update a machine-learning classification model used by the artificial-intelligence engine based on determining that the first connection request is valid.

In some embodiments, the computing platform may identify a first behavior deviation associated with the first user computing device based on monitoring the behavior of the first user computing device. Subsequently, the computing platform may score the first behavior deviation associated with the first user computing device, and scoring the first behavior deviation associated with the first user computing device may produce a first deviation score value. Then, the computing platform may execute one or more policy enforcement actions based on the first deviation score value.

In some embodiments, the computing platform may receive, via the communication interface, from a second user computing device, a second connection request. Subsequently, the computing platform may generate, using the artificial-intelligence engine, a second profile for the second connection request. Based on the second profile for the second connection request generated using the artificial-intelligence engine, the computing platform may determine that the second connection request is invalid. In response to determining that the second connection request is invalid, the computing platform may deny the second connection request.

In some embodiments, after denying the second connection request, the computing platform may update a machine-learning classification model used by the artificial-intelligence engine based on determining that the second connection request is invalid.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for optimizing authentication and management of wireless devices in zero trust computing environments in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to continuous authentication methods using 5G communications, particularly in Zero Trust Architecture (ZTA) environments. For example, 5G networks may handle multiplexing particularly well. With conventional communications methods, multi-factor authentication typically may be done in a serial manner; but with 5G communications, multi-factor authentication may be implemented in parallel and/or in a continuous manner (e.g., facial scan, fingerprint, voice—all at once). This may be particularly valuable in ZTA environments where additional and/or continuous authentication may be required to access and/or modify secure data. The system may adapt to use different sensors and/or sensor data at different times. In some instances, the system may rely on user behavior analytics for continuous authentication. In some instances, the shape, beamforming, quality of service (QoS) properties of the 5G signal may be an authentication factor in continuous authentication (e.g., because it may reveal information about the user's location).

Figure 1A:
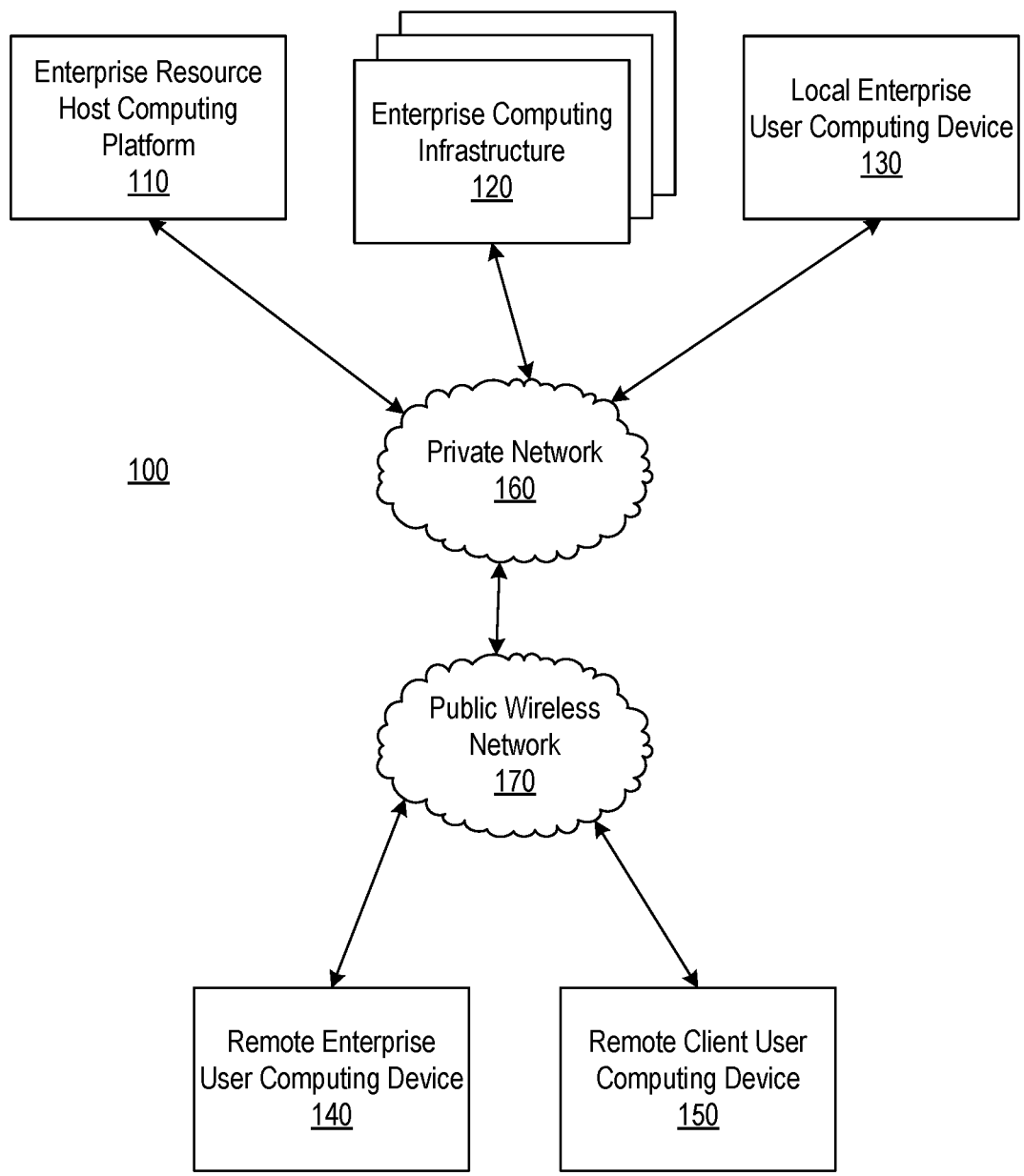
FIGS. 1A-1D depict an illustrative computing environment for optimizing authentication and management of wireless devices in zero trust computing environments in accordance with one or more example embodiments.
Figure 1B:
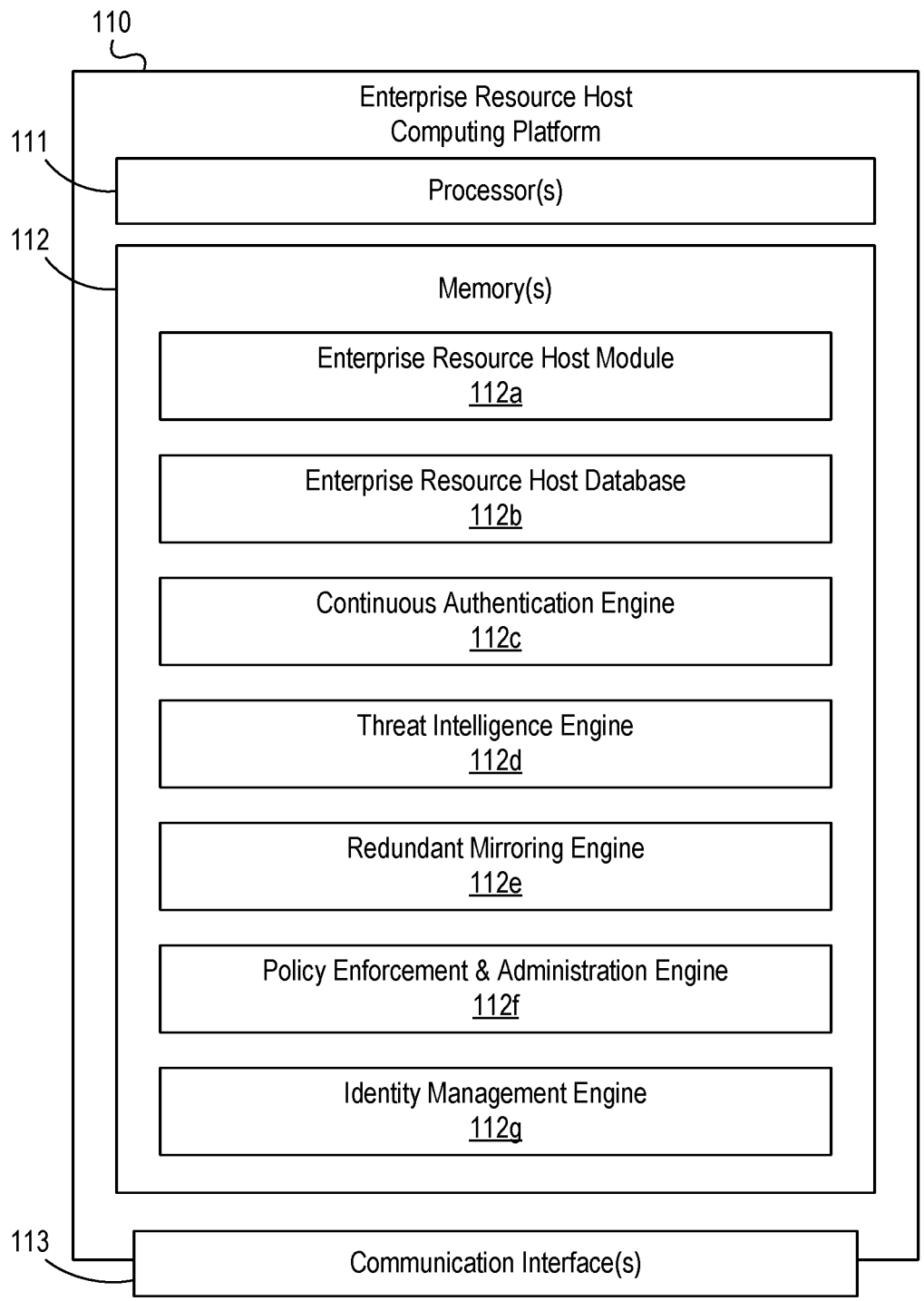

FIGS. 1A and 1B depict an illustrative computing environment for optimizing authentication and management of wireless devices in zero trust computing environments in accordance with one or more example embodiments. Referring to FIG. 1A, computing environment 100 may include one or more computer systems. For example, computing environment 100 may include an enterprise resource host computing platform 110, enterprise computing infrastructure 120, a local enterprise user computing device 130, a remote enterprise user computing device 140, and a remote client user computing device 150.

As illustrated in greater detail below, enterprise resource host computing platform 110 may include one or more computing devices configured to perform one or more of the functions described herein. For example, enterprise resource host computing platform 110 may include one or more computers (e.g., laptop computers, desktop computers, servers, server blades, or the like).

Enterprise computing infrastructure 120 may include one or more computing devices and/or other computer components (e.g., processors, memories, communication interfaces). In addition, and as illustrated in greater detail below, enterprise computing infrastructure 120 may be configured to provide various enterprise and/or back-office computing functions for an organization, such as a financial institution. For example, enterprise computing infrastructure 120 may include various servers and/or databases that host, execute, and/or store various enterprise resources (e.g., enterprise applications, enterprise databases, enterprise information). For instance, enterprise computing infrastructure 120 may include various servers and/or databases that store and/or otherwise maintain account information, such as financial account information including account balances, transaction history, account owner information, and/or other information. In addition, enterprise computing infrastructure 120 may host, execute, and/or store one or more enterprise applications that process and/or otherwise execute transactions on specific accounts based on commands and/or other information received from other computer systems included in computing environment 100. Additionally or alternatively, enterprise computing infrastructure 120 may load data from enterprise resource host computing platform 110, manipulate and/or otherwise process such data, and return modified data and/or other data to enterprise resource host computing platform 110 and/or to other computer systems included in computing environment 100.

Local enterprise user computing device 130 may be a personal computing device (e.g., desktop computer, laptop computer) or mobile computing device (e.g., smartphone, tablet). In addition, local enterprise user computing device 130 may be linked to and/or used by a specific enterprise user (who may, e.g., be an employee or other affiliate of an enterprise organization operating enterprise resource host computing platform 110). For instance, local enterprise user computing device 130 may be linked to and/or used by a first enterprise user within a secure perimeter established by the enterprise organization, such as within a private network (e.g., private network 160) hosted by the enterprise organization.

Remote enterprise user computing device 140 also may be a personal computing device (e.g., desktop computer, laptop computer) or mobile computing device (e.g., smartphone, tablet). In addition, remote enterprise user computing device 140 may be linked to and/or used by a specific enterprise user (who may, e.g., be an employee or other affiliate of an enterprise organization operating enterprise resource host computing platform 110). For instance, remote enterprise user computing device 140 may be linked to and/or used by a second enterprise user (e.g., different from the first enterprise user associated with local enterprise user computing device 130) outside of a secure perimeter established by the enterprise organization, such as outside of a private network (e.g., private network 160) hosted by the enterprise organization.

Remote client user computing device 150 also may be a personal computing device (e.g., desktop computer, laptop computer) or mobile computing device (e.g., smartphone, tablet). In addition, remote client user computing device 150 may be linked to and/or used by a specific non-enterprise user (who may, e.g., be a customer of an enterprise organization operating enterprise resource host computing platform 110). For instance, remote client user computing device 150 may be linked to and/or used by a non-enterprise user (e.g., different from the first enterprise user associated with local enterprise user computing device 130 and the second enterprise user associated with remote enterprise user computing device 140) outside of a secure perimeter established by the enterprise organization, such as outside of a private network (e.g., private network 160) hosted by the enterprise organization.

Computing environment 100 also may include one or more networks, which may interconnect one or more of enterprise resource host computing platform 110, enterprise computing infrastructure 120, local enterprise user computing device 130, remote enterprise user computing device 140, and remote client user computing device 150. For example, computing environment 100 may include a private network 160 (which may, e.g., interconnect enterprise resource host computing platform 110, enterprise computing infrastructure 120, local enterprise user computing device 130, and/or one or more other systems which may be associated with an organization, such as a financial institution) and public wireless network 170 (which may, e.g., interconnect remote enterprise user computing device 140 and remote client user computing device 150 with private network 160 and/or one or more other systems, public networks, sub-networks, and/or the like). In some instances, public wireless network 170 may include one or more fifth-generation (5G) wireless networks.

In one or more arrangements, enterprise computing infrastructure 120, local enterprise user computing device 130, remote enterprise user computing device 140, remote client user computing device 150, and/or the other systems included in computing environment 100 may be any type of computing device capable of receiving a user interface, receiving input via the user interface, and communicating the received input to one or more other computing devices. For example, enterprise computing infrastructure 120, local enterprise user computing device 130, remote enterprise user computing device 140, and remote client user computing device 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of enterprise resource host computing platform 110, enterprise computing infrastructure 120, local enterprise user computing device 130, remote enterprise user computing device 140, and remote client user computing device 150 may, in some instances, be special-purpose computing devices configured to perform specific functions.

Referring to FIG. 1B, enterprise resource host computing platform 110 may include one or more processor(s) 111, memory(s) 112, and communication interface(s) 113. A data bus may interconnect processor 111, memory 112, and communication interface 113. Communication interface 113 may be a network interface configured to support communication between enterprise resource host computing platform 110 and one or more networks (e.g., network 160, network 170, or the like). Memory 112 may include one or more program modules and/or processing engines having instructions that when executed by processor 111 cause enterprise resource host computing platform 110 to perform one or more functions described herein and/or one or more databases that may store and/or otherwise maintain information which may be used by such program modules, processing engines, and/or processor 111. In some instances, the one or more program modules, processing engines, and/or databases may be stored by and/or maintained in different memory units of enterprise resource host computing platform 110 and/or by different computing devices that may form and/or otherwise make up enterprise resource host computing platform 110. For example, memory 112 may have, store, and/or include an enterprise resource host module 112a, an enterprise resource host database 112b, a continuous authentication engine 112c, a threat intelligence engine 112d, redundant mirroring engine 112e, policy enforcement and administration engine 112f, and identity management engine 112g.

Enterprise resource host module 112a may have instructions that direct and/or cause enterprise resource host computing platform 110 to optimize authentication and management of wireless devices in zero trust computing environments, as discussed in greater detail below. Enterprise resource host database 112b may store information used by enterprise resource host module 112a and/or enterprise resource host computing platform 110 in optimizing authentication and management of wireless devices in zero trust computing environments. Continuous authentication engine 112c may perform and/or provide one or more continuous authentication functions and/or services, as illustrated in greater detail below. Threat intelligence engine 112d may perform and/or provide one or more threat intelligence functions and/or services, as illustrated in greater detail below.

Redundant mirroring engine 112e may perform and/or provide one or more redundant mirroring functions and/or services, as illustrated in greater detail below. For instance, in a 5G wireless environment, many devices may attempt to connect to enterprise resource host computing platform 110, with relatively more frequency, bandwidth, and speed than might be available on conventional wireless networks, and this greater volume of connection requests may create one or more technical problems. Redundant mirroring engine 112e may provide one or more technical solutions, insofar as redundant mirroring engine 112*e* may enable enterprise resource host computing platform 110 to efficiently and effective sort and/or handle such connection requests. Redundant mirroring engine 112*e* also may protect enterprise resource host computing platform 110 against denial of service (DoS) attacks and ensure uninterrupted connectivity for enterprise resource host computing platform 110 (e.g., to enable continued processing of legitimate requests).

Figure 1C:
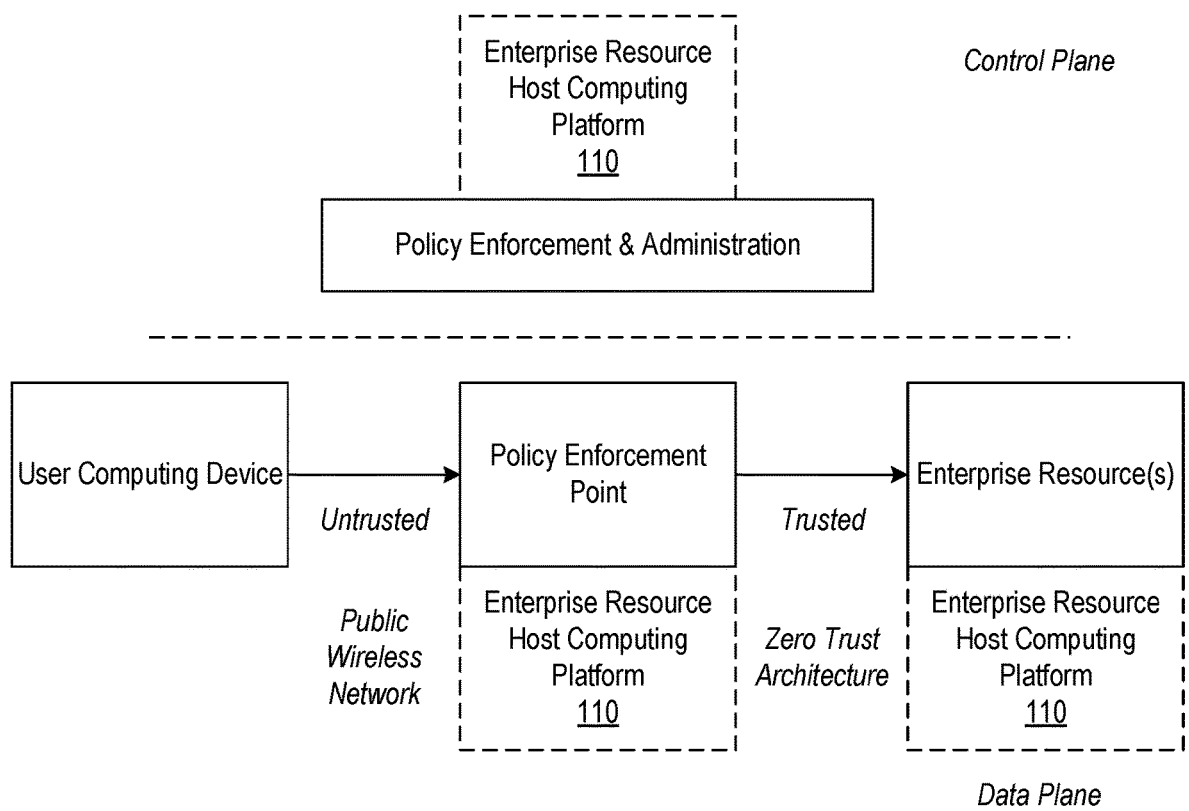

Policy enforcement and administration engine 112*f* may perform and/or provide one or more policy enforcement and administration functions and/or services (e.g., monitoring device behavior and ensuring compliance with one or more enterprise policies), as illustrated in greater detail below. Identity management engine 112*g* may perform and/or provide one or more identity management functions and/or services (e.g., assigning specific identities to specific devices to enable continuous authentication and monitoring in a zero trust computing environment), as illustrated in greater detail below Referring to FIG. 1C, an example logical view of a zero trust configuration of computing environment 100 is illustrated. For example, and as seen in FIG. 1C, enterprise resource host computing platform 110 may provide policy enforcement and administration functions and/or services in a control plane of computing environment 100. In addition, enterprise resource host computing platform 110 may provide a policy enforcement point and control access to one or more enterprise resources (which may, e.g., be hosted by enterprise computing infrastructure 120) in a data plane of computing environment 100. When a user computing device (e.g., local enterprise user computing device 130, remote enterprise user computing device 140, and remote client user computing device 150) sends a connection request (which may, e.g., originate in an untrusted zone of computing environment 100, such as public wireless network 170) to access enterprise resource host computing platform 110 and/or one or more secure enterprise resources, enterprise resource host computing platform 110 may authenticate the device (which may, e.g., provide the device with access to a trusted zone of computing environment 100) and subsequently may continuously monitor the device's behavior (e.g., using a zero trust architecture authentication model), as illustrated in greater detail below.

Figure 1D:
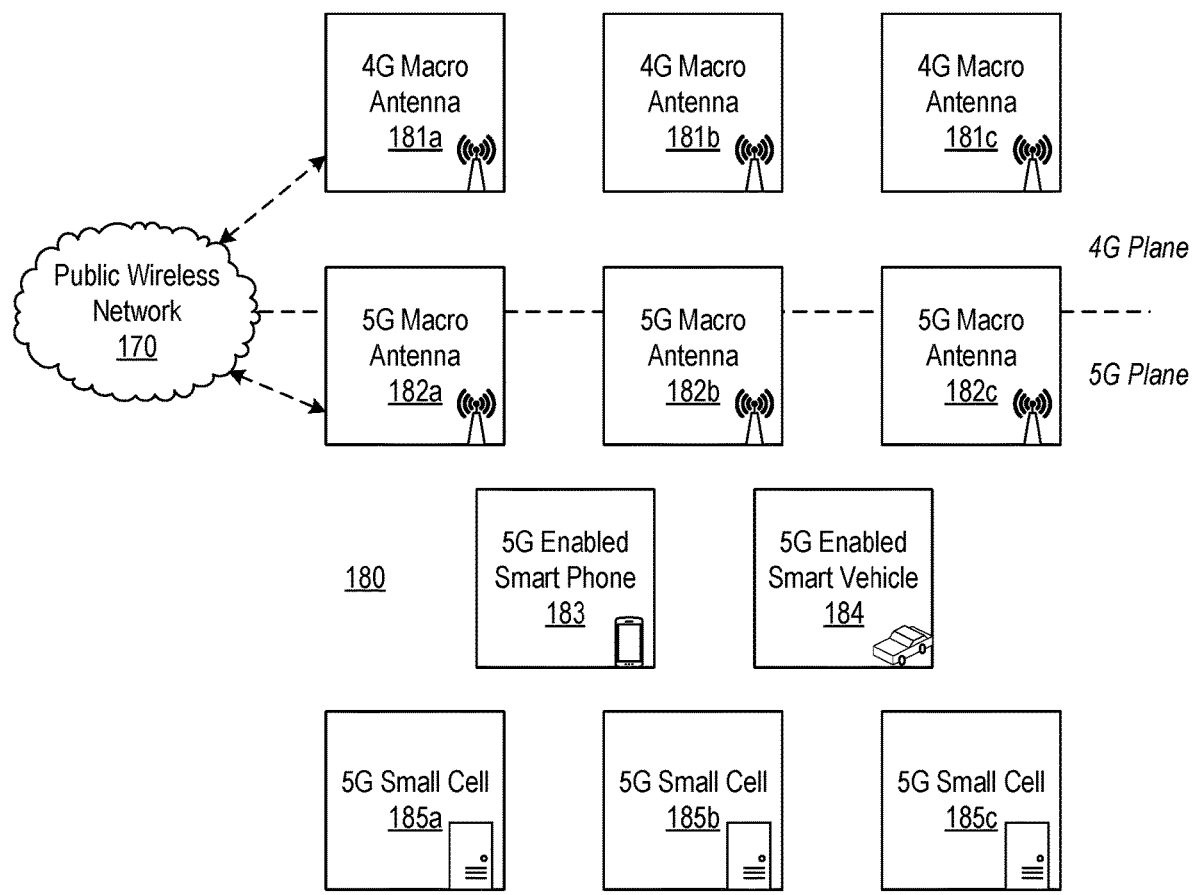

Referring to FIG. 1D, an example physical view of network components which may be included in computing environment 100 and which may be connected to public wireless network 170 is illustrated. For example, and as seen in FIG. 1D, public wireless network 170 may connect to one or more 4G macro antennas, which may operate in a 4G plane of public wireless network 170, such as 4G macro antenna 181*a*, 4G macro antenna 181*b*, and 4G macro antenna 181*c*. In addition, public wireless network 170 may connect to one or more 5G macro antennas, which may operate in a 5G plane 180 of public wireless network 170, such as 5G macro antenna 182*a*, 5G macro antenna 182*b*, and 5G macro antenna 182*c*. One or more 5G devices also may operate within 5G plane 180, and such 5G devices may connect to the one or more 5G macro antennas and/or other systems and/or devices linked to public wireless network 170. For example, 5G plane 180 may include a 5G enabled smart phone 183, a 5G enabled smart vehicle 184, and one or more 5G small cells, such as 5G small cell 185*a*, 5G small cell 185*b*, and 5G small cell 185*c*. Any and/or all of these devices may send connection requests to enterprise resource host computing platform 110 and may be authenticated and/or otherwise processed by enterprise resource host computing platform 110 in accordance with the examples illustrated below. In some instances, one or more network operators operating the 5G macro antennas may provide enterprise resource host computing platform 110 with information that identifies details (e.g., device type, device ID, device properties, or the like) about devices requesting to connect to enterprise resource host computing platform 110. As illustrated below, enterprise resource host computing platform 110 may use such information to authenticate and/or filter connection requests from such devices.

Figure 2A:
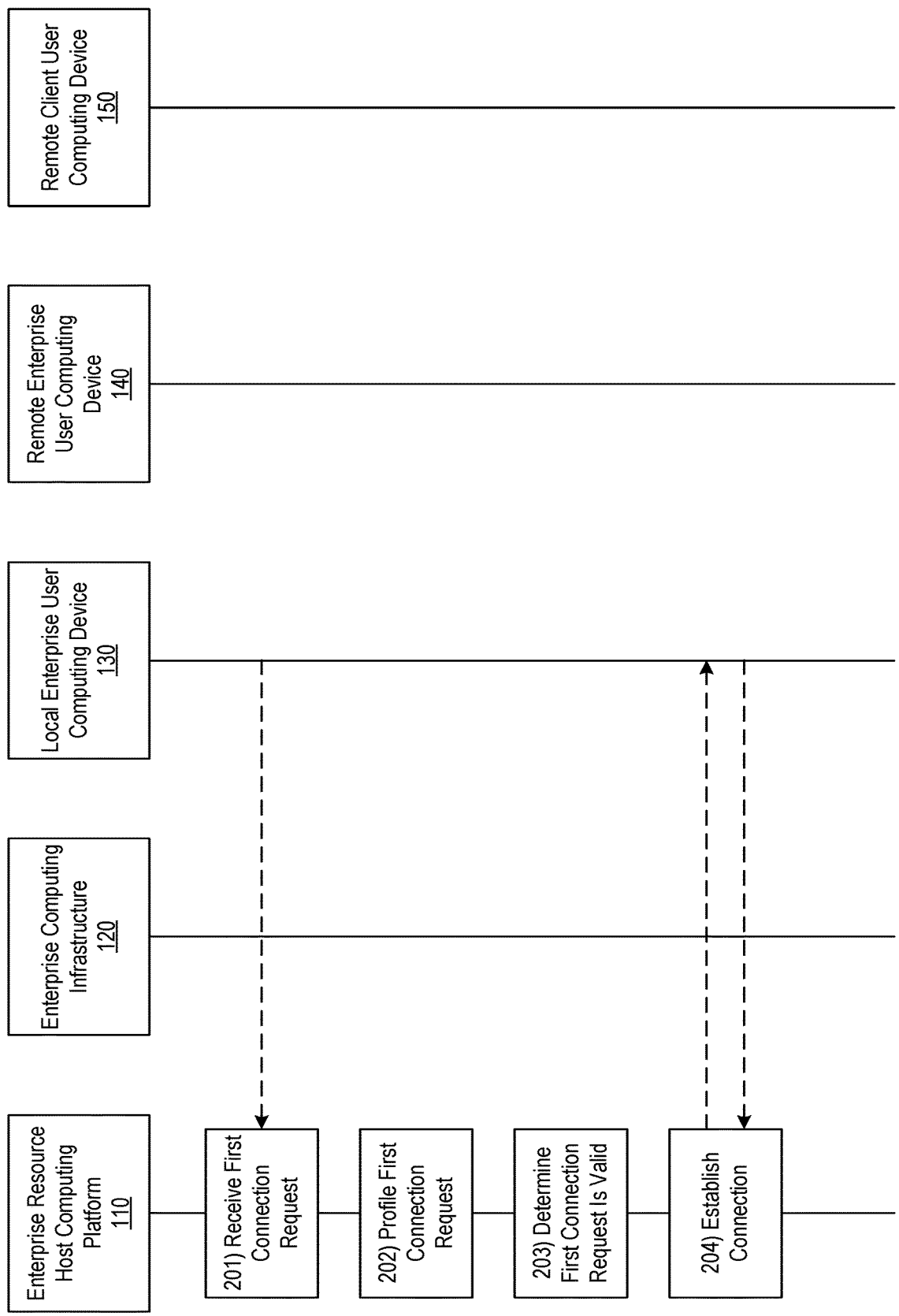

FIGS. 2A-2D depict an illustrative event sequence for optimizing authentication and management of wireless devices in zero trust computing environments in accordance with one or more example embodiments. Referring to FIG. 2A, at step 201, enterprise resource host computing platform 110 may receive a first connection request from local enterprise user computing device 130. For example, at step 201, enterprise resource host computing platform 110 may receive, via the communication interface (e.g., communication interface 113), from a first user computing device (e.g., local enterprise user computing device 130), a first connection request.

In some embodiments, receiving the first connection request from the first user computing device may include receiving the first connection request from the first user computing device via a fifth-generation (5G) wireless network. For example, in receiving the first connection request from the first user computing device (e.g., local enterprise user computing device 130), enterprise resource host computing platform 110 may receive the first connection request from the first user computing device (e.g., local enterprise user computing device 130) via a fifth-generation (5G) wireless network. In some instances, a network operator of the 5G wireless network may forward connection details information to enterprise resource host computing platform 110 along with the first connection request. Such connection details information may, for instance, include information identifying the device type, device ID, device location, device properties, connection type, connection speed, connection properties, and/or other information, which may be used by enterprise resource host computing platform 110 in continuously authenticating local enterprise user computing device 130, as illustrated in greater detail below.

At step 202, enterprise resource host computing platform 110 may profile the first connection request. For example, at step 202, enterprise resource host computing platform 110 may generate, using an artificial-intelligence engine, a first profile for the first connection request. For instance, the first profile for the first connection request (which may, e.g., be generated by enterprise resource host computing platform 110) may include a score value determined by the artificial-intelligence engine based on a machine learning model (which may, e.g., be applied by the artificial-intelligence engine to classify and filter connection requests and which may be trained on a labeled dataset identifying features of previous valid and/or invalid connection requests).

In some embodiments, generating the first profile for the first connection request using the artificial-intelligence engine may include: capturing one or more connection parameters of the first connection request; and scoring the one or more connection parameters of the first connection request based on a parameter model generated by the artificial-intelligence engine based on a training dataset comprising connection parameter data associated with past connection requests. In addition, scoring the one or more connection parameters of the first connection request based on the parameter model generated by the artificial-intelligence engine may produce a first connection request score value. For example, in generating the first profile for the first connection request using the artificial-intelligence engine at step 202, enterprise resource host computing platform 110 may capture one or more connection parameters of the first connection request. Such connection parameters may, for instance, include information identifying the device type of the device sending the first connection request, the device ID of the device sending the first connection request, an estimated device location of the device sending the first connection request, device properties of the device sending the first connection request, a connection type used by the device sending the first connection request, a connection speed used by the device sending the first connection request, one or more connection properties associated with the device sending the first connection request, and/or other information associated with the device sending the first connection request. In addition, enterprise resource host computing platform 110 may score the one or more connection parameters of the first connection request based on a parameter model generated by the artificial-intelligence engine based on a training dataset comprising connection parameter data associated with past connection requests. For example, enterprise resource host computing platform 110 may apply a parameter model (which may, e.g., be trained and/or otherwise generated by the artificial-intelligence engine on enterprise resource host computing platform 110) to the one or more connection parameters of the first connection request to calculate a first connection request score value (which may, e.g., be used by enterprise resource host computing platform 110 in determining whether the connection request is valid, as illustrated in greater detail below). The connection request score value may, for instance, be calculated by enterprise resource host computing platform 110 by determining one or more distance scores between expected parameter values and actual parameter values and then summing and/or averaging the distance scores.

In some embodiments, scoring the one or more connection parameters of the first connection request based on the parameter model generated by the artificial-intelligence engine may include scoring a network address of the first connection request, a device identifier of the first user computing device, a screen size parameter of the first user computing device, or one or more operating parameters of the first user computing device. For example, in scoring the one or more connection parameters of the first connection request based on the parameter model generated by the artificial-intelligence engine, enterprise resource host computing platform 110 may score a network address of the first connection request, a device identifier of the first user computing device (e.g., local enterprise user computing device 130), a screen size parameter of the first user computing device (e.g., local enterprise user computing device 130), or one or more operating parameters of the first user computing device (e.g., local enterprise user computing device 130). In this way, the artificial-intelligence engine running on enterprise resource host computing platform 110 may filter connection requests based on network address, device identifier, screen size, and/or other operating parameters.

At step 203, enterprise resource host computing platform 110 may determine that the first connection request is valid (e.g., based on comparing the connection request profile and/or score(s) determined in the examples above to one or more valid profile templates and/or threshold value(s)). For example, at step 203, based on the first profile for the first connection request generated using the artificial-intelligence engine, enterprise resource host computing platform 110 may determine that the first connection request is valid. In some embodiments, determining that the first connection request is valid may include determining that the first connection request is valid based on the first connection request score value exceeding a threshold value computed by the artificial-intelligence engine. For example, in determining that the first connection request is valid at step 203, enterprise resource host computing platform 110 may determine that the first connection request is valid based on the first connection request score value exceeding a threshold value computed by the artificial-intelligence engine. Such a threshold value may, for instance, be periodically recalculated by the artificial-intelligence engine based on new and/or updated training data, including labeled data and/or unlabeled data associated with recent and/or previous connection requests.

At step 204, enterprise resource host computing platform 110 may establish a connection with local enterprise user computing device 130 (e.g., to allow and/or provide access to an implicit trust zone). For example, at step 204, in response to determining that the first connection request is valid, enterprise resource host computing platform 110 may establish a first connection with the first user computing device (e.g., local enterprise user computing device 130). In some embodiments, establishing the first connection with the first user computing device may include allowing the first user computing device to access an implicit trust zone associated with at least one enterprise resource. For example, in establishing the first connection with the first user computing device (e.g., local enterprise user computing device 130), enterprise resource host computing platform 110 may allow the first user computing device (e.g., local enterprise user computing device 130) to access an implicit trust zone associated with at least one enterprise resource. For instance, the at least one enterprise resource may be hosted in and/or only accessible via the implicit trust zone, and enterprise resource host computing platform 110 thus may control access to the at least one enterprise resource (which may, e.g., include one or more enterprise applications, one or more enterprise databases, and/or other enterprise information).

Referring to FIG. 2B, at step 205, enterprise resource host computing platform 110 may update a machine-learning model used by the artificial-intelligence engine. For example, at step 205, after establishing the first connection with the first user computing device (e.g., local enterprise user computing device 130), enterprise resource host computing platform 110 may update a machine-learning classification model used by the artificial-intelligence engine based on determining that the first connection request is valid. For instance, in updating the machine-learning classification model used by the artificial-intelligence engine, enterprise resource host computing platform 110 may add features and/or characteristics of the first connection request to a 'valid request' component of the model and/or otherwise update the model based on features and/or characteristics of the first connection request.

At step 206, enterprise resource host computing platform 110 may assign a first identify to the user device (e.g., local enterprise user computing device 130). For example, at step 206, based on establishing the first connection with the first user computing device (e.g., local enterprise user computing device 130), enterprise resource host computing platform 110 may assign a first identity to the first user computing device (e.g., local enterprise user computing device 130).

The identity assigned by enterprise resource host computing platform 110 may, for instance, define a set of policies to be applied to local enterprise user computing device 130 while the first connection is established and/or a set of valid device behaviors (e.g., a specific set of actions that local enterprise user computing device 130 may validly perform within the trust zone and/or the broader enterprise perimeter while the first connection is established, without being subject to termination of the first connection and/or other policy enforcement actions).

In some embodiments, assigning the first identity to the first user computing device may include calculating an initial trust score based on device properties of the first user computing device and connection properties of the first connection. For example, in assigning the first identity to the first user computing device (e.g., local enterprise user computing device 130), enterprise resource host computing platform 110 may calculate an initial trust score based on device properties of the first user computing device (e.g., local enterprise user computing device 130) and connection properties of the first connection. For instance, enterprise resource host computing platform 110 may calculate the initial trust score based on device properties of the first user computing device (e.g., local enterprise user computing device 130) such as device type, device operating system, device software version information, device identifier information, and/or other device-specific information. Additionally or alternatively, enterprise resource host computing platform 110 may calculate the initial trust score based on connection properties such as 5G wireless signal shape properties, beamforming properties of the 5G wireless signal, quality of service (QoS) properties of the 5G wireless signal, and/or other properties of the connection established with local enterprise user computing device 130. In some instances, the trust score (which may, e.g., be calculated by enterprise resource host computing platform 110) may be weighted based on specific parameters, such as the network address of the device, the location of the device, user identification information, user role information (which may, e.g., identify the user's role within the enterprise organization), and/or other parameters.

At step 207, enterprise resource host computing platform 110 may monitor device behavior based on the assigned identity. For example, at step 207, after assigning the first identity to the first user computing device (e.g., local enterprise user computing device 130), enterprise resource host computing platform 110 may monitor behavior of the first user computing device (e.g., local enterprise user computing device 130) based on the first identity assigned to the first user computing device (e.g., local enterprise user computing device 130). For instance, in monitoring the behavior of the first user computing device (e.g., local enterprise user computing device 130) based on the first identity assigned to the first user computing device (e.g., local enterprise user computing device 130), enterprise resource host computing platform 110 may continuously monitor such behavior (e.g., evaluating every input, output, and/or action taken by the device in the network environment while the first connection is established). Additionally or alternatively, enterprise resource host computing platform 110 may continuous monitor how the device (e.g., local enterprise user computing device 130) accesses and/or otherwise interacts with one or more enterprise resources, such as one or more enterprise resources controlled and/or hosted by enterprise resource host computing platform 110 and/or enterprise computing infrastructure 120.

In some embodiments, monitoring the behavior of the first user computing device based on the first identity assigned to the first user computing device may include monitoring the behavior of the first user computing device based on the initial trust score. For example, in monitoring the behavior of the first user computing device (e.g., local enterprise user computing device 130) based on the first identity assigned to the first user computing device (e.g., local enterprise user computing device 130), enterprise resource host computing platform 110 may monitor the behavior of the first user computing device (e.g., local enterprise user computing device 130) based on the initial trust score. For instance, depending on the identity assigned to the user device (e.g., local enterprise user computing device 130) and/or the initial trust score calculated for the connection at step 203, enterprise resource host computing platform 110 may subject the user device (local enterprise user computing device 130) to different levels of continuous monitoring (e.g., while the first connection is established). For example, if the trust score is above a first threshold, enterprise resource host computing platform 110 may allow the user device to access the enterprise resource with only intermittent and/or relatively less monitoring. If the trust score is below the first threshold but above a second threshold, enterprise resource host computing platform 110 may allow the user device to access the enterprise resource with continuous and/or relatively more monitoring. If the trust score is below the second threshold, enterprise resource host computing platform 110 may deny and/or prevent the user device from accessing the enterprise resource.

As illustrated above, enterprise resource host computing platform 110 may implement a zero trust architecture in which identities are assigned to user devices (e.g., by enterprise resource host computing platform 110) and subjected to continuous monitoring after they connect (e.g., to protect against insider threats and/or other cybersecurity threats). For example, a given user device may have rights to access or read data from an enterprise resource, but not to modify or write data to the enterprise resource. Any attempt by the user device to perform an unauthorized behavior or similar action may cause enterprise resource host computing platform 110 to generate one or more alerts and/or terminate the connection with the user device. In addition, particular user device actions may be validated by enterprise resource host computing platform 110 against a dataset of valid behaviors specifying the normal range of actions for specific types of devices and/or groups of devices. Further, with respect to a given device, enterprise resource host computing platform 110 may use properties of the device's connection (and the connection's corresponding 5G wireless signal) to continuously authenticate and/or monitor the device. For instance, the wireless signal shape, beamforming properties, QoS properties, and/or other wireless signal properties of a given device's wireless connection may be an authentication factor that is used by enterprise resource host computing platform 110 in performing continuous authentication (e.g., because these properties may review information about the device's location and/or operating state). Such continuous monitoring may provide various technical advantages, such as enabling an enterprise organization to protect against inbound cyberattacks and to protect against enterprise devices being used as bots in outbound cyberattacks (e.g., distributed denial of service (DDoS) attacks on internal or external systems). Some examples of possible enforcement actions that may be performed by enterprise resource host computing platform 110 upon detecting an invalid behavior and/or upon detecting invalid device/connection properties (and thus invalid authentication) are discussed in one or more examples illustrated below.

Continuing to refer to FIG. 2B, at step 208, enterprise resource host computing platform 110 may identify a behavior deviation. For example, at step 208, enterprise resource host computing platform 110 may identify a first behavior deviation associated with the first user computing device (e.g., local enterprise user computing device 130) based on monitoring the behavior of the first user computing device (e.g., local enterprise user computing device 130). For instance, enterprise resource host computing platform 110 may detect that local enterprise user computing device 130 has attempted to execute or has executed an action that exceeds the device's assigned identity and/or its associated valid range of behaviors.

Figure 2C:
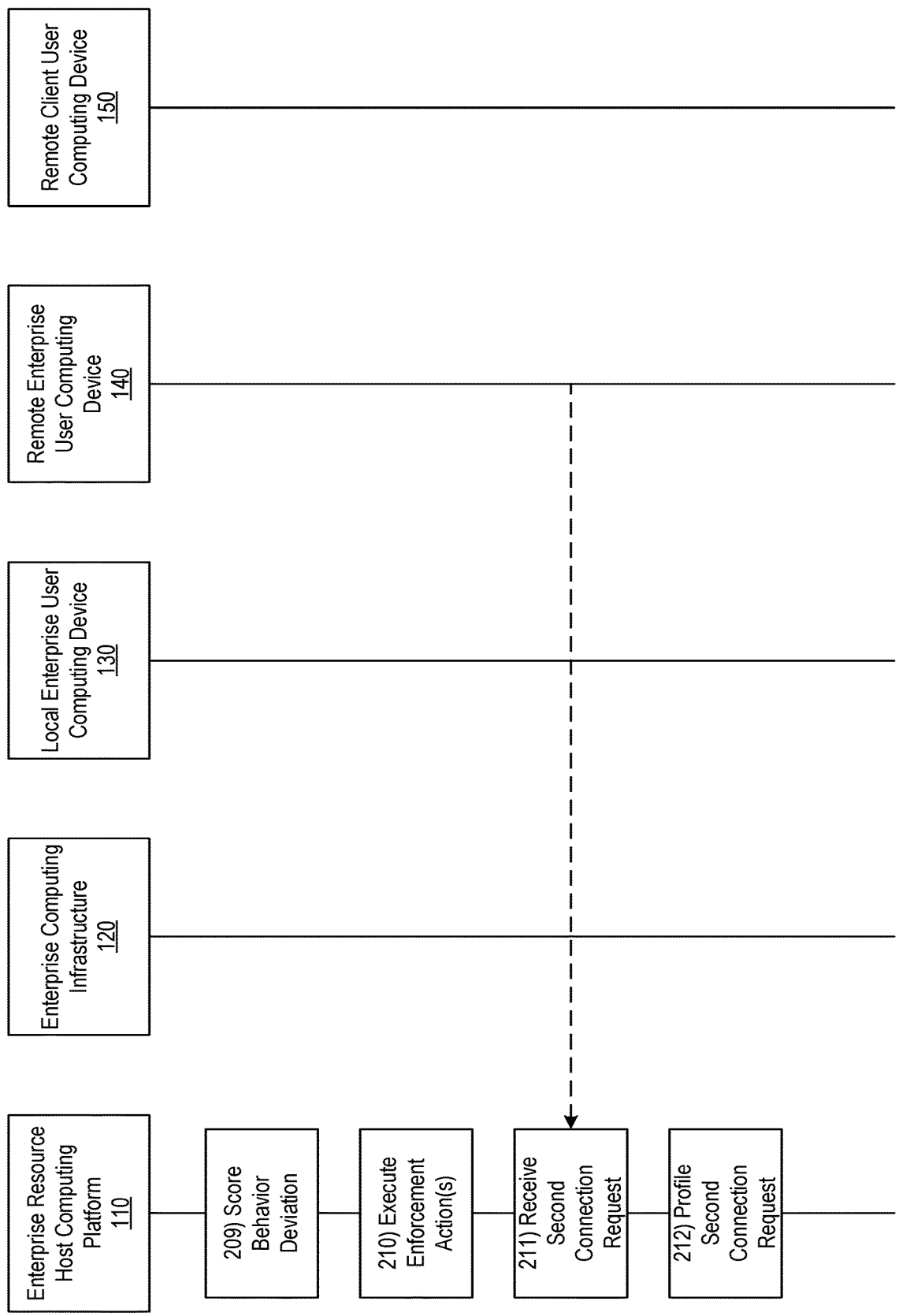

Referring to FIG. 2C, at step 209, enterprise resource host computing platform 110 may score the behavior deviation. For example, at step 209, enterprise resource host computing platform 110 may score the first behavior deviation associated with the first user computing device (e.g., local enterprise user computing device 130), and scoring the first behavior deviation associated with the first user computing device (e.g., local enterprise user computing device 130) may produce a first deviation score value. For instance, enterprise resource host computing platform 110 may calculate such a deviation score value based on the distance(s) between actual behavior parameters and permitted/valid behavior parameters.

At step 210, enterprise resource host computing platform 110 may execute one or more enforcement actions (e.g., based on the deviation score determined at step 209). For example, at step 210, enterprise resource host computing platform 110 may execute one or more policy enforcement actions based on the first deviation score value. For instance, in executing the one or more policy enforcement actions, enterprise resource host computing platform 110 may discontinue and/or otherwise terminate the connection with the user device (e.g., local enterprise user computing device 130), flag the connection and/or the device for further investigation by an internal cybersecurity team, selectively cut and/or otherwise deny access to specific enterprise resources, and/or perform other actions. The action(s) executed by enterprise resource host computing platform 110 may, for instance, depend on the degree to which the device's actual behavior (e.g., the deviation score value) deviates from the valid and/or expected behavior range. For instance, if the deviation is relatively large, enterprise resource host computing platform 110 may execute a relatively more aggressive action such as terminating the connection. Alternatively, if the deviation is relatively small, enterprise resource host computing platform 110 may execute a relatively less aggressive action such as generating an alert to an internal team or generating a warning to the device user.

Figure 3:
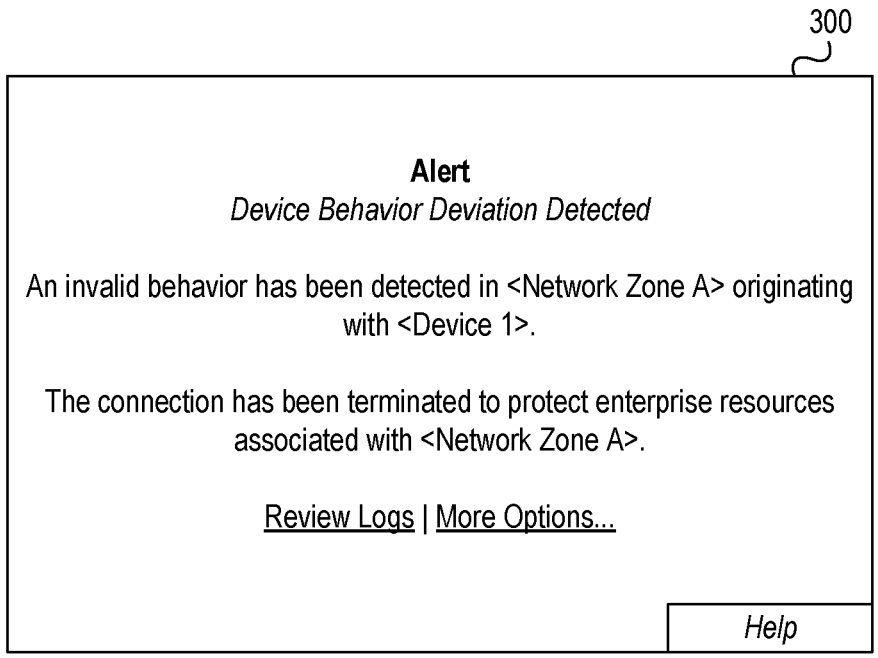
FIGS. 3 and 4 depict example graphical user interfaces for optimizing authentication and management of wireless devices in zero trust computing environments in accordance with one or more example embodiments.

For example, in generating an alert to an internal team (e.g., when executing one or more enforcement actions at step 210), enterprise resource host computing platform 110 may cause a computing device (e.g., an administrative computing device linked to a network administrator or other enterprise cybersecurity user) to display and/or otherwise present a graphical user interface similar to graphical user interface 300, which is illustrated in FIG. 3. As seen in FIG. 3, graphical user interface 300 may include text and/or other information alerting the user of the behavior deviation and/or the enforcement actions (e.g., "An invalid behavior has been detected in <Network Zone A> originating with <Device 1>. The connection has been terminated to protect enterprise resources associated with <Network Zone A>. Review Logs More Options . . . ").

Figure 4:
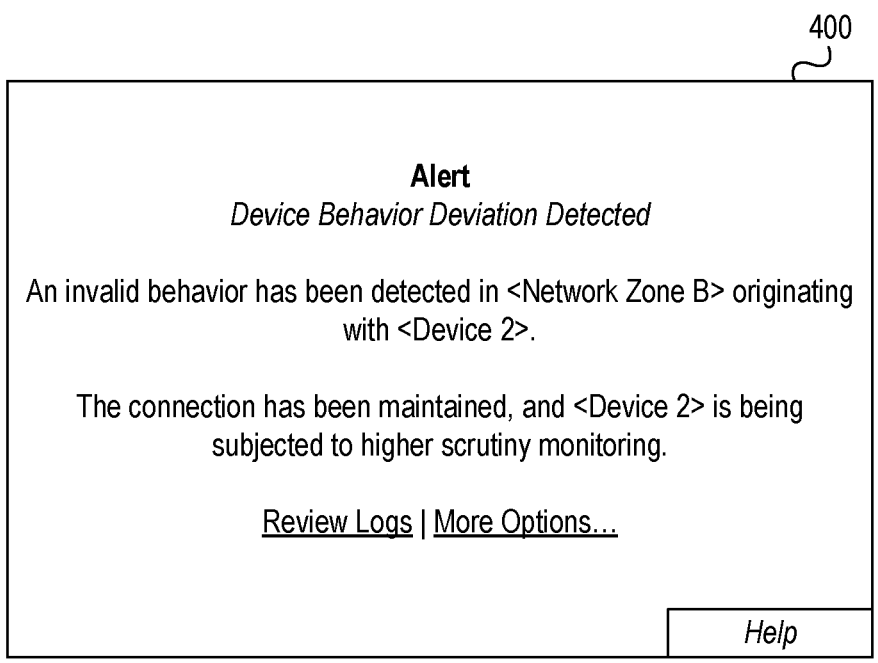

As another example, in generating a warning to the device user (e.g., when executing one or more enforcement actions at step 210), enterprise resource host computing platform 110 may cause the user device (e.g., local enterprise user computing device 130) to display and/or otherwise present a graphical user interface similar to graphical user interface 400, which is illustrated in FIG. 4. As seen in FIG. 4, graphical user interface 400 may include text and/or other information alerting the user of the behavior deviation and/or the enforcement actions (e.g., "An invalid behavior has been detected in <Network Zone B> originating with <Device 2>. The connection has been maintained, and <Device 2> is being subjected to higher scrutiny monitoring. Review Logs|More Options . . . ").

Subsequently, enterprise resource host computing platform 110 may continue processing other additional connection requests from the same and/or different user devices. For instance, at step 211, enterprise resource host computing platform 110 may receive a second connection request from remote enterprise user computing device 140 (e.g., via a 5G wireless network). For example, at step 211, enterprise resource host computing platform 110 may receive, via the communication interface (e.g., communication interface 113), from a second user computing device (e.g., remote enterprise user computing device 140), a second connection request. The second connection request may, for instance, be received by enterprise resource host computing platform 110 similar to how the first connection request may be received in the examples discussed above.

At step 212, enterprise resource host computing platform 110 may profile the second connection request. For example, at step 212, enterprise resource host computing platform 110 may generate, using the artificial-intelligence engine, a second profile for the second connection request. The second profile for the second connection request may, for instance, be generated by enterprise resource host computing platform 110 similar to how the first profile for the first connection request may be generated in the examples discussed above.

Referring to FIG. 2D, at step 213, enterprise resource host computing platform 110 may determine that the second connection request is invalid (e.g., based on comparing the connection request profile and/or score(s) determined at step 212 to one or more valid and/or invalid profile templates and/or threshold value(s)). For example, at step 213, based on the second profile for the second connection request generated using the artificial-intelligence engine, enterprise resource host computing platform 110 may determine that the second connection request is invalid. For instance, in determining that the second connection request is invalid at step 213, enterprise resource host computing platform 110 may determine that the second connection request is invalid based on the second connection request score value not exceeding a threshold value computed by the artificial-intelligence engine. Like in the examples discussed above, such a threshold value may, for instance, be periodically recalculated by the artificial-intelligence engine based on new and/or updated training data, including labeled data and/or unlabeled data associated with recent and/or previous connection requests.

At step 214, enterprise resource host computing platform 110 may deny the second connection request. For example, at step 214, in response to determining that the second connection request is invalid, enterprise resource host computing platform 110 may deny the second connection request.

At step 215, enterprise resource host computing platform 110 may update the machine-learning model used by the artificial-intelligence engine. For example, at step 215, after denying the second connection request, enterprise resource host computing platform 110 may update a machine-learning classification model used by the artificial-intelligence engine based on determining that the second connection request is invalid. For instance, in updating the machine-learning classification model used by the artificial-intelligence engine, enterprise resource host computing platform 110 may add features and/or characteristics of the second connection request to an 'invalid request' component of the model and/or otherwise update the model based on features and/or characteristics of the second connection request. In some instances, after denying the second connection request, enterprise resource host computing platform 110 may identify a reason for denying the connection request (e.g., invalid network address, invalid device identifier, invalid screen size, other invalid parameters, or the like) and may update the machine-learning classification model based on the identified reason (e.g., reflecting what was learned by enterprise resource host computing platform 110 from the connection request).

At step 216, enterprise resource host computing platform 110 may continue processing other connection requests (e.g., from local enterprise user computing device 130, remote enterprise user computing device 140, remote client user computing device 150). For example, at step 216, enterprise resource host computing platform 110 may continue processing connection requests and continuously authenticating various devices to secure enterprise resources in a zero trust computing environment by performing one or more steps similar to those described above.

Figure 5:
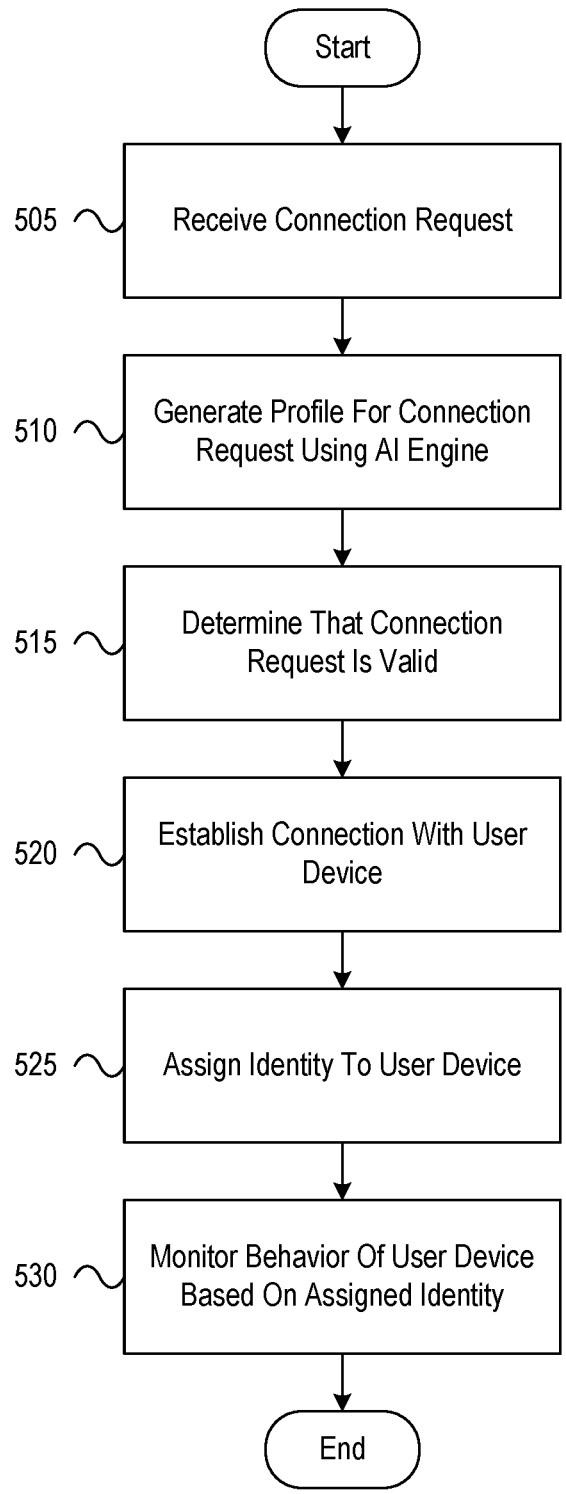
FIG. 5 depicts an illustrative method for optimizing authentication and management of wireless devices in zero trust computing environments in accordance with one or more example embodiments.

FIG. 5 depicts an illustrative method for optimizing authentication and management of wireless devices in zero trust computing environments in accordance with one or more example embodiments. Referring to FIG. 5, at step 505, a computing platform having at least one processor, a communication interface, and memory may receive, via the communication interface, from a first user computing device, a first connection request. At step 510, the computing platform may generate, using an artificial-intelligence engine, a first profile for the first connection request. At step 515, based on the first profile for the first connection request generated using the artificial-intelligence engine, the computing platform may determine that the first connection request is valid. At step 520, in response to determining that the first connection request is valid, the computing platform may establish a first connection with the first user computing device. At step 525, based on establishing the first connection with the first user computing device, the computing platform may assign a first identity to the first user computing device. At step 530, after assigning the first identity to the first user computing device, the computing platform may monitor behavior of the first user computing device based on the first identity assigned to the first user computing device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:
1. A computing platform, comprising:
at least one processor;
a communication interface communicatively coupled to the at least one processor; and memory storing computer-readable instructions that, when executed by the at least one processor, cause the computing platform to:
receive, via the communication interface, from a first user computing device, a first connection request;
generate, using an artificial-intelligence engine, a first profile for the first connection request;
based on the first profile for the first connection request generated using the artificial-intelligence engine, determine that the first connection request is valid;
in response to determining that the first connection request is valid, establish a first connection with the first user computing device;
based on establishing the first connection with the first user computing device, assign a first identity to the first user computing device; and
after assigning the first identity to the first user computing device, monitor behavior of the first user computing device based on the first identity assigned to the first user computing device.

2. The computing platform of claim 1, wherein receiving the first connection request from the first user computing device comprises receiving the first connection request from the first user computing device via a fifth-generation (5G) wireless network.

3. The computing platform of claim 1, wherein generating the first profile for the first connection request using the artificial-intelligence engine comprises:
capturing one or more connection parameters of the first connection request; and
scoring the one or more connection parameters of the first connection request based on a parameter model generated by the artificial-intelligence engine based on a training dataset comprising connection parameter data associated with past connection requests,
wherein scoring the one or more connection parameters of the first connection request based on the parameter model generated by the artificial-intelligence engine produces a first connection request score value.

4. The computing platform of claim 3, wherein scoring the one or more connection parameters of the first connection request based on the parameter model generated by the artificial-intelligence engine comprises scoring a network address of the first connection request, a device identifier of the first user computing device, a screen size parameter of the first user computing device, or one or more operating parameters of the first user computing device.

5. The computing platform of claim 3, wherein determining that the first connection request is valid comprises determining that the first connection request is valid based on the first connection request score value exceeding a threshold value computed by the artificial-intelligence engine.

6. The computing platform of claim 1, wherein establishing the first connection with the first user computing device comprises allowing the first user computing device to access an implicit trust zone associated with at least one enterprise resource.

7. The computing platform of claim 1, wherein assigning the first identity to the first user computing device comprises calculating an initial trust score based on device properties of the first user computing device and connection properties of the first connection.

8. The computing platform of claim 7, wherein monitoring the behavior of the first user computing device based on the first identity assigned to the first user computing device comprises monitoring the behavior of the first user computing device based on the initial trust score.

9. The computing platform of claim 1, wherein the memory stores additional computer-readable instructions that, when executed by the at least one processor, cause the computing platform to:
after establishing the first connection with the first user computing device, update a machine-learning classification model used by the artificial-intelligence engine based on determining that the first connection request is valid.

10. The computing platform of claim 1, wherein the memory stores additional computer-readable instructions that, when executed by the at least one processor, cause the computing platform to:
identify a first behavior deviation associated with the first user computing device based on monitoring the behavior of the first user computing device;
score the first behavior deviation associated with the first user computing device, wherein scoring the first behavior deviation associated with the first user computing device produces a first deviation score value; and
execute one or more policy enforcement actions based on the first deviation score value.

11. The computing platform of claim 1, wherein the memory stores additional computer-readable instructions that, when executed by the at least one processor, cause the computing platform to:
receive, via the communication interface, from a second user computing device, a second connection request;
generate, using the artificial-intelligence engine, a second profile for the second connection request;
based on the second profile for the second connection request generated using the artificial-intelligence engine, determine that the second connection request is invalid; and
in response to determining that the second connection request is invalid, deny the second connection request.

12. The computing platform of claim 11, wherein the memory stores additional computer-readable instructions that, when executed by the at least one processor, cause the computing platform to:
after denying the second connection request, update a machine-learning classification model used by the artificial-intelligence engine based on determining that the second connection request is invalid.

13. A method, comprising:
at a computing platform comprising at least one processor, a communication interface, and memory:
receiving, by the at least one processor, via the communication interface, from a first user computing device, a first connection request;
generating, by the at least one processor, using an artificial-intelligence engine, a first profile for the first connection request;
based on the first profile for the first connection request generated using the artificial-intelligence engine, determining, by the at least one processor, that the first connection request is valid;
in response to determining that the first connection request is valid, establishing, by the at least one processor, a first connection with the first user computing device;
based on establishing the first connection with the first user computing device, assigning, by the at least one processor, a first identity to the first user computing device; and after assigning the first identity to the first user computing device, monitoring, by the at least one processor, behavior of the first user computing device based on the first identity assigned to the first user computing device.

14. The method of claim 13, wherein receiving the first connection request from the first user computing device comprises receiving the first connection request from the first user computing device via a fifth-generation (5G) wireless network.

15. The method of claim 13, wherein generating the first profile for the first connection request using the artificial-intelligence engine comprises:
   capturing one or more connection parameters of the first connection request; and
   scoring the one or more connection parameters of the first connection request based on a parameter model generated by the artificial-intelligence engine based on a training dataset comprising connection parameter data associated with past connection requests,
   wherein scoring the one or more connection parameters of the first connection request based on the parameter model generated by the artificial-intelligence engine produces a first connection request score value.

16. The method of claim 15, wherein scoring the one or more connection parameters of the first connection request based on the parameter model generated by the artificial-intelligence engine comprises scoring a network address of the first connection request, a device identifier of the first user computing device, a screen size parameter of the first user computing device, or one or more operating parameters of the first user computing device.

17. The method of claim 15, wherein determining that the first connection request is valid comprises determining that the first connection request is valid based on the first connection request score value exceeding a threshold value computed by the artificial-intelligence engine.

18. The method of claim 13, wherein establishing the first connection with the first user computing device comprises allowing the first user computing device to access an implicit trust zone associated with at least one enterprise resource.

19. The method of claim 13, wherein assigning the first identity to the first user computing device comprises calculating an initial trust score based on device properties of the first user computing device and connection properties of the first connection.

20. One or more non-transitory computer-readable media storing instructions that, when executed by a computing platform comprising at least one processor, a communication interface, and memory, cause the computing platform to:
   receive, via the communication interface, from a first user computing device, a first connection request;
   generate, using an artificial-intelligence engine, a first profile for the first connection request;
   based on the first profile for the first connection request generated using the artificial-intelligence engine, determine that the first connection request is valid;
   in response to determining that the first connection request is valid, establish a first connection with the first user computing device;
   based on establishing the first connection with the first user computing device, assign a first identity to the first user computing device; and
   after assigning the first identity to the first user computing device, monitor behavior of the first user computing device based on the first identity assigned to the first user computing device.

\* \* \* \* \*